United States Patent [19]
Pawelzik et al.

[11] Patent Number: 5,755,258
[45] Date of Patent: May 26, 1998

[54] SINGLE-LEVER MIXING VALVE WITH VALVE CARTRIDGE

[75] Inventors: Manfred Pawelzik, Soest; Fred Hannemann, Herzberg, both of Germany

[73] Assignee: Friedrich Grohe AG, Hemer, Germany

[21] Appl. No.: 810,980

[22] Filed: Feb. 27, 1997

[30] Foreign Application Priority Data

Mar. 19, 1996 [DE] Germany ............... 196 10 620.6

[51] Int. Cl.$^6$ ............................................. F16K 25/00
[52] U.S. Cl. ........................... 137/454.6; 137/625.4
[58] Field of Search ..................... 137/454.6, 625.4, 137/625.17, 801

[56] References Cited

U.S. PATENT DOCUMENTS

| | | | |
|---|---|---|---|
| 2,923,318 | 2/1960 | Monson | 137/454.6 |
| 3,788,601 | 1/1974 | Schmitt | 137/454.6 |
| 4,226,260 | 10/1980 | Schmitt | 137/454.6 |
| 4,285,361 | 8/1981 | Lissau | 137/454.6 |
| 4,887,642 | 12/1989 | Bernat | 137/625.17 |
| 4,941,506 | 7/1990 | Bergmann | 137/625.17 |
| 4,971,113 | 11/1990 | Pawelzik et al. | 137/625.17 |
| 5,195,555 | 3/1993 | Kanpp | 137/454.6 |

FOREIGN PATENT DOCUMENTS

| | | |
|---|---|---|
| 0616156 | 9/1994 | European Pat. Off. . |
| 0641963 | 3/1995 | European Pat. Off. . |
| 2528520 | 12/1983 | France . |
| 41 39 814 | 6/1993 | Germany . |
| 4139814 | 6/1993 | Germany . |

Primary Examiner—Denise L. Ferensic
Assistant Examiner—Joanne Y. Kim
Attorney, Agent, or Firm—Herbert Dubno; Andrew Wilford

[57] ABSTRACT

A valve assembly has a housing forming an outlet, having an axis, and secured on a support surface. A support block in the housing has a pair of inlet ports adapted to be connected to pressurized feed lines and an output port communicating with the outlet of the housing. A valve cartridge sitting on the support block includes a casing centered on the housing axis and having a rear end formed with axially rearwardly directed bumps and a stack of disks in the casing including an end disk formed with ports provided with seals projecting axially forward past the casing to the respective support-block ports and at least one valve disk displaceable to vary flow from the inlet ports to the outlet port. A stem projecting axially rearward from the casing is displaceable to move the valve disk. A retaining sleeve formed with a screwthread threadedly engaging the housing is centered on the axis, surrounds the valve cartridge, has a front end bearing directly on the support block, and has a shoulder bearing axially forward on the bumps of the casing and pressing the seals into the support-block ports so that the casing is retained by the sleeve on the support block. A handle is mounted on the stem outside the housing.

12 Claims, 3 Drawing Sheets

SINGLE-LEVER MIXING VALVE WITH VALVE CARTRIDGE

FIELD OF THE INVENTION

The present invention relates to a single-lever mixing valve. More particularly this invention concerns such a valve which is provided with a valve cartridge and a method of assembling the valve.

BACKGROUND OF THE INVENTION

A standard valve assembly as described in German patent document 4,139,814 has a housing forming an outlet and having an axis and provided with a valve cartridge including a casing centered on the housing axis and having a rear end formed with axially rearwardly directed bumps, a stack of disks in the casing including an end disk formed with ports provided with seals projecting axially forward past the casing to the respective support-block ports and at least one valve disk displaceable to vary flow from the inlet ports to the outlet port, and a stem projecting axially rearward from the casing and displaceable to move the valve disk. A handle is mounted on the stem outside the housing.

In this arrangement the housing is provided with a stepped compartment for receiving the cartridge which itself has a radially projecting rim that sits on a rim or shoulder of the housing. A nut holds the cartridge down in position. The rim prevents the clamping force from distorting the cartridge and causing it to seal improperly. It has the disadvantage of substantially increasing the size of the valve assembly.

OBJECTS OF THE INVENTION

It is therefore an object of the present invention to provide an improved single-lever valve assembly.

Another object is the provision of such an improved single-lever valve assembly which overcomes the above-given disadvantages, that is which is of compact construction and which can be rebuilt or refitted with parts of slightly different size.

A further object is to provide an improved method of assembling such a valve.

SUMMARY OF THE INVENTION

A valve assembly has according to the invention a housing forming an outlet, having an axis, and secured on a support surface. A support block in the housing has a pair of inlet ports adapted to be connected to pressurized feed lines and an output port communicating with the outlet of the housing. A valve cartridge sitting on the support block includes a casing centered on the housing axis and having a rear end formed with axially rearwardly directed bumps and a stack of disks in the casing including an end disk formed with ports provided with seals projecting axially forward past the casing to the respective support-block ports and at least one valve disk displaceable to vary flow from the inlet ports to the outlet port. A stem projecting axially rearward from the casing is displaceable to move the valve disk. A retaining sleeve formed with a screwthread threadedly engaging the housing is centered on the axis, surrounds the valve cartridge, has a front end bearing directly on the support block, and has a shoulder bearing axially forward on the bumps of the casing and pressing the seals into the support-block ports so that the casing is retained by the sleeve on the support block. A handle is mounted on the stem outside the housing.

With this system the sleeve which closely surrounds the cartridge takes up very little room so that the overall width or diameter of the housing can be quite small, making a slim and attractive appearance. In addition the forces applied to the cartridge in no way tend to distort it so that its valve disks will slide smoothly without leaking on one another. On the other hand the sleeve can apply considerable force in a very uniform manner to the cartridge so that its seals will be compressed to form a very tight seal on the support block, which can be unitary with the housing or a separate part.

According to the invention the bumps are segmental axial rearward projections. They are unitary with the normally plastic casing. To make the cartridge fit it is possible to cut down these bumps, normally by ultrasonic or other heating, to fit the cartridge to the housing.

The housing in accordance with the invention is formed with an axially rearwardly directed shoulder and the support block rests on the housing shoulder. Seal rings are provided between the support block and the housing as well as a stabilizing pin seated in the housing and in the support block offset from the axis. The retaining sleeve is of metal and its screwthread is external.

The cartridge according to the invention has a front face turned toward the support block and spaced therefrom by at most 0.6 mm. Preferably the spacing is 0.1 mm to 0.3 mm.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
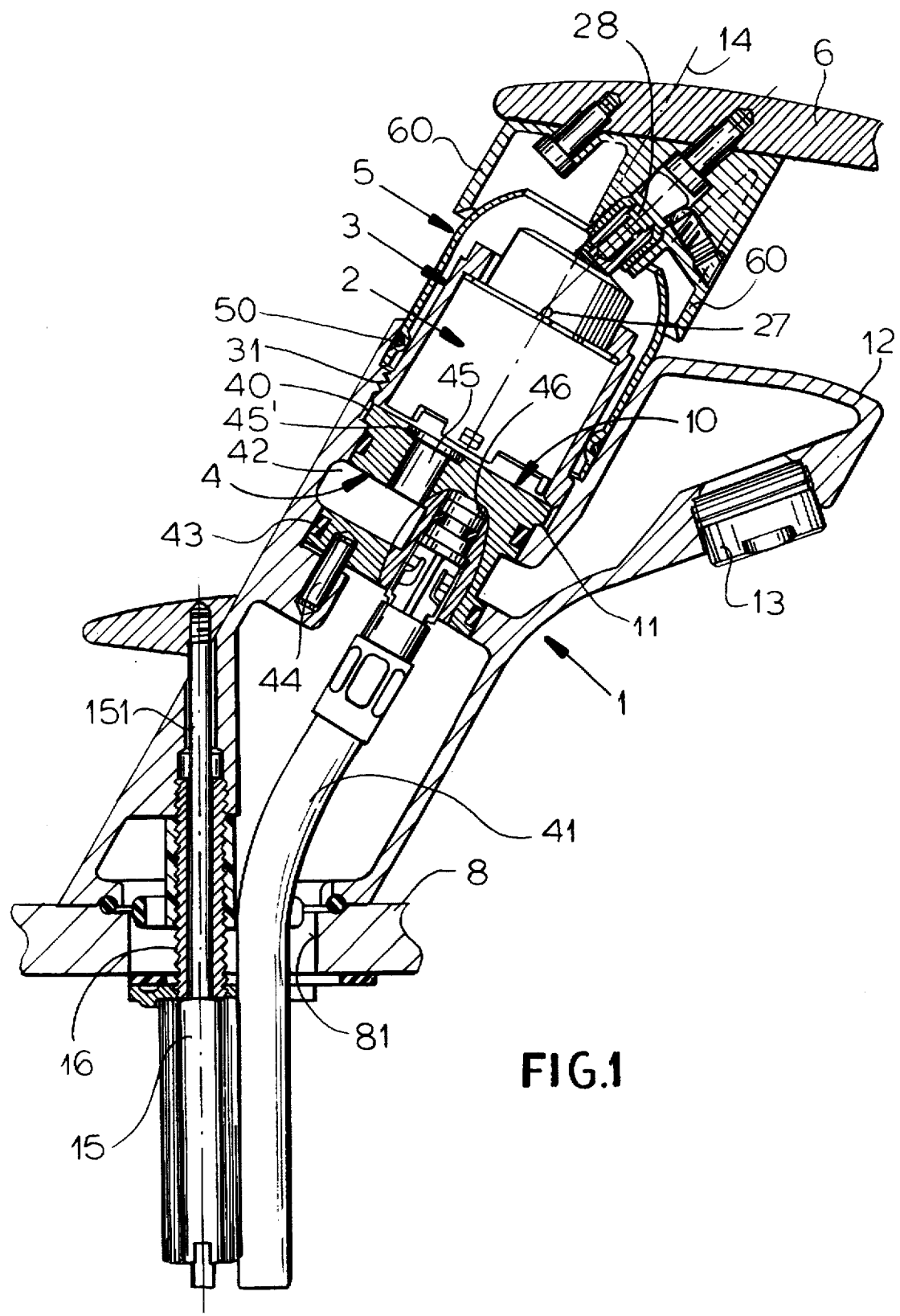
FIG. 1 is a vertical section through a mixing faucet according to the invention.

As seen in FIG. 1 a mixing-faucet assembly has a housing 1 adapted to sit on a counter 8 over a hole 81 therein. This housing 1 holds a standard valve cartridge 2 secured via a retaining sleeve 3 to an insert or support block 4 in the housing 1. A decor cover 5 fitted with a handle 6 completes the assembly.

The housing 1 is formed with a spout 12 provided with an aerator 13 and has a shoulder 11 on which sits the support block 4. A threaded sleeve 16 projects down through the counter hole 81 and is provided with a nut 15 to secure this housing 1 tightly in place on the counter 8 with an axis 14 of the housing 1 inclined somewhat to the vertical. Normally the housing 1 is made of metal although construction of a durable plastic is also possible.

The support block 4 is formed with two input ports 46 (only one visible in the drawing) to which are connected pressurized input lines for hot and cold water and has another throughgoing port or passage 45 that opens into a compartment 42 that leads to the spout 12. Thus as is standard hot and cold water is applied under pressure from the feed tubes 41 to the cartridge 2 and a stream of normally mixed hot and cold water flows from the cartridge 2 via the compartment 42 to the spout 12 whence it exits the fixture through the aerator 13. O-rings 43 seal the block 4 with respect to the housing 1 and a pin 44 extending parallel to and offset from the axis 14 is seated in the housing 1 and in the block 4 to prevent it from rotating in the housing 1 about the axis 14.

Figure 4:
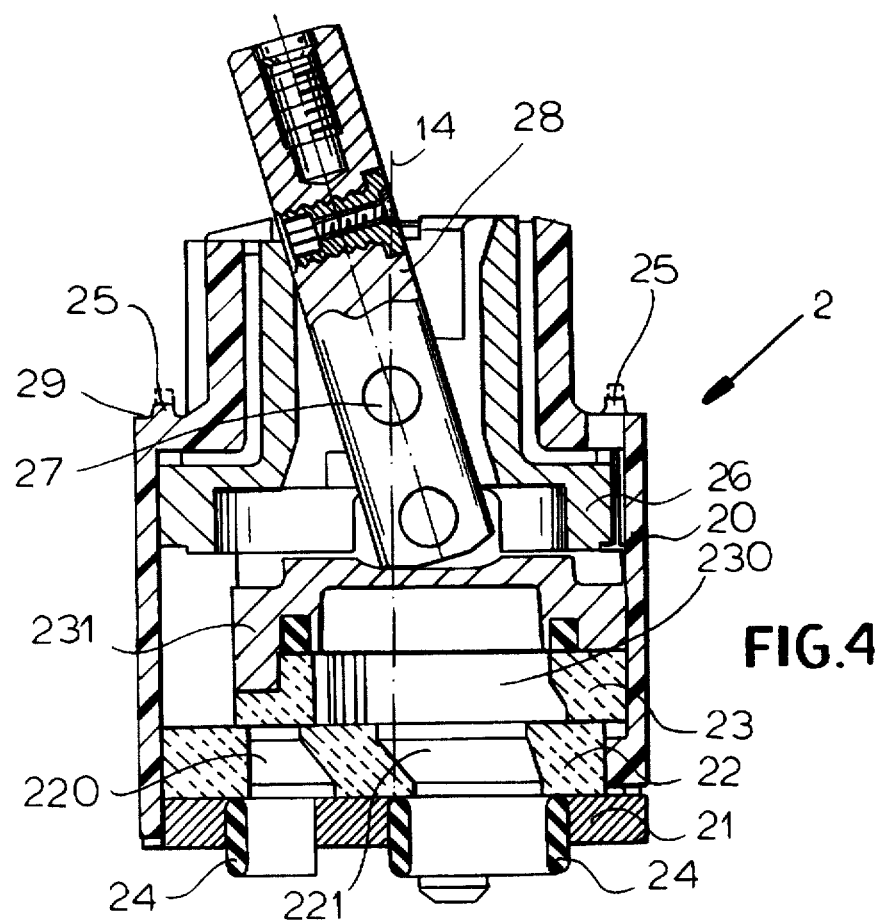
FIG. 4 is an axial section through the valve cartridge of this invention.

The valve cartridge 2 as also shown in FIG. 4 has a stepped cylindrical casing 20 made of plastic and provided on its lower end with a mounting plate or disk 21 provided in line with inlet and outlet ports 220 and 221 of a ceramic fixed valve disk 22 with further such ports provided with seals 24 that are compressed as described below against the block 4 which has matching ports 45 and 46 for the outlet compartment and input lines 41. The ports 45 and 46 of the block 4 are widened as indicate at 45' for port 45 in FIG. 1 to accommodate these seals 24.

In addition to the fixed ported disk 22 the valve cartridge 2 has a movable ceramic valve disk 23 formed with a flow port 230 and fixed to a disk 231 pivoted at the bottom end of a lever 28 pivoted centrally at 27 in a bushing 26 rotatable in the casing 20 about the axis 14. As is standard, tipping the lever or stem 28 about the pivot 27 which extends perpendicular to the axis 14 varies the amount of flow from the inlet lines 41 to the outlet compartment 42, and rotating it about its axis 14 varies the mix of hot and cold water delivered to this outlet compartment 42 from the supply lines 41.

The handle 6 is fixed to the stem 28 and has a skirt 60 that fits down over the decor cover 5 as shown in FIG. 1. This decor cover sleeve 5 is snap fitted in the housing 1 and sealed with respect thereto by an O-ring 50.

Figure 2:
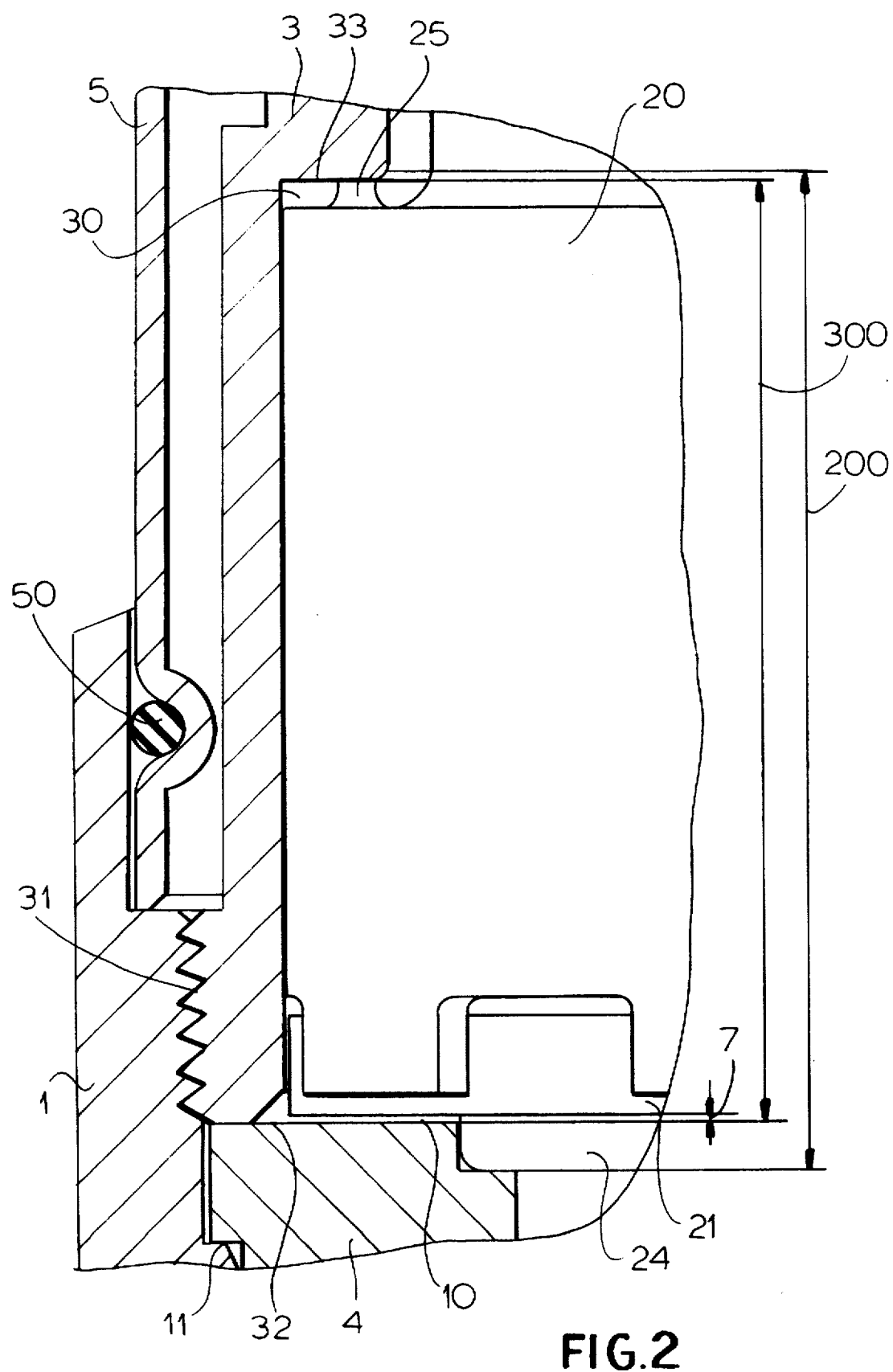
FIG. 2 is a larger-scale view of a detail of FIG. 1.
Figure 3:
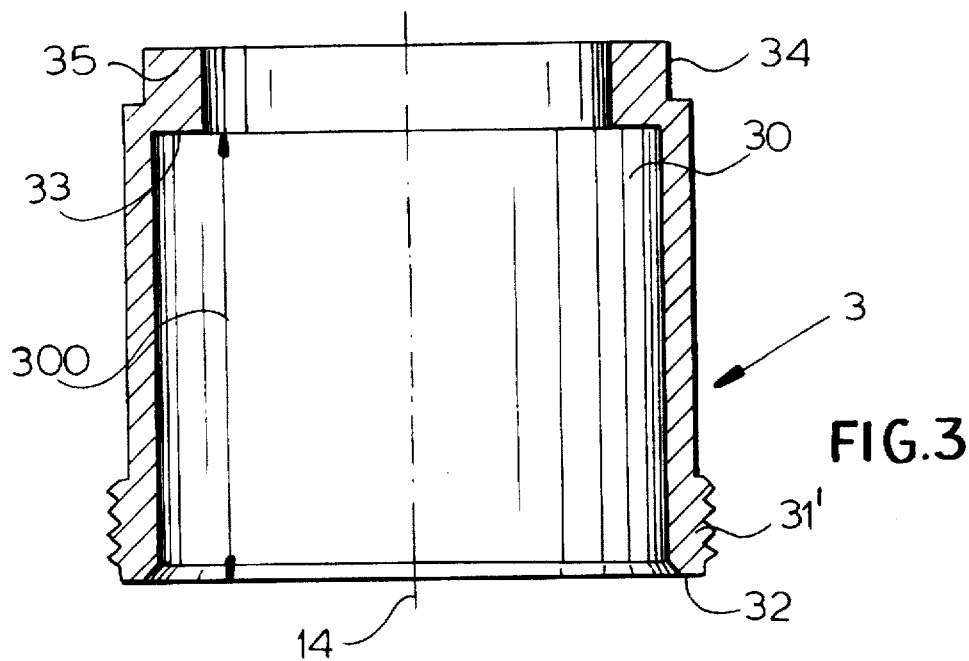
FIG. 3 is an axial section through the retaining sleeve of this invention.

As best shown in FIGS. 2 and 3, the sleeve 3 is of stepped shape and centered on the axis 14. At its lower end it has an external screwthread 31' that mates with a complementary such screwthread 31 of the housing 1. A fine thread, for example an M42×1.5 is used. The sleeve 3 has a lower edge 32 that presses a rim 40 of the block 4 down against the shoulder 11. At its upper end it has a thickened inset region 35 that forms a shoulder 33 that bears on bumps 25 formed on an upwardly directed shoulder 29 of the casing 20. The outside of the inset region 35 has formations 34 that interfit with a tool, for instance a screwdriver or socket wrench, for installation of the part 3.

The cartridge 2 has an overall height 200 measured from the rear faces of the bumps 25 to the front edges of the seals 24 that is adjusted by heat or ultrasonic melting of the bumps 25 so that when its rear end is bearing axially backward against the shoulder 33 of the sleeve 3 and its seals 24 are seated in the respective ports 45 and 46 leaving a space 7 normally of 0.1 mm to 0.3 mm, at most 0 mm to 0.6 mm, between the lower face of the disk 21 and the back face 10 of the block 4.

Such a valve is installed by first mounting the housing 1 on the deck 8 and then fitting the block 4 into position while connecting its lines 41 to the respective sources. The cartridge 2 is then, if necessary, put together and the height of the plastic segmental bumps 25 is reduced to produce the desired length 200, normally dependent on the thicknesses of the plates 21, 22, and 23. The support block 4 is fitted in place and then the cartridge 2 is set atop it. The sleeve 3 is screwed down in the screwthread 31 to clamp the shoulder 40 of the block 4 between the sleeve edge 32 and the shoulder 11 and compress the seals 24 in the widened ends of the respective ports 45 and 46. Then the decor sleeve 5 is snapped into position and the handle 6 is mounted on the stem 28 to complete the installation.

The block 4 can be formed integrally with the housing 1. In addition the disk 21 can be dispensed with and the seals 24 mounted directly on the ceramic disk 22 without departing from the scope of the invention.

We claim:

1. A valve assembly comprising:
    a housing forming an outlet and having an axis;
    means for securing the housing on a support surface;
    a support block in the housing having a pair of inlet ports adapted to be connected to pressurized feed lines and an output port communicating with the outlet of the housing;
    a valve cartridge sitting on the support block and including
        a casing centered on the housing axis and having a rear end formed with axially rearwardly directed bumps,
        a stack of disks in the casing including an end disk formed with ports provided with seals projecting axially forward past the casing to the respective support-block ports and at least one valve disk displaceable to vary flow from the inlet ports to the outlet port, and
        a stem projecting axially rearward from the casing and displaceable to move the valve disk;
    a retaining sleeve formed with a screwthread threadedly engaging the housing, centered on the axis, surrounding the valve cartridge, having a front end bearing directly on the support block, and having a shoulder bearing axially forward on the bumps of the casing and pressing the seals into the support-block ports, whereby the casing is retained by the sleeve on the support block; and
    a handle mounted on the stem outside the housing.

2. The valve assembly defined in claim 1 wherein the bumps are segmental axial rearward projections.

3. The valve assembly defined in claim 2 wherein the projections are unitary with the casing.

4. The valve assembly defined in claim 1 wherein the housing is formed with an axially rearwardly directed shoulder and the support block rests on the housing shoulder.

5. The valve assembly defined in claim 4, further comprising
    seal rings between the support block and the housing.

6. The valve assembly defined in claim 4 further comprising
    a stabilizing pin seated in the housing and in the support block offset from the axis.

7. The valve assembly defined in claim 1 wherein the retaining sleeve is of metal and its screwthread is external.

8. The valve assembly defined in claim 1 wherein the cartridge has a front face turned toward the support block and spaced therefrom by at most 0.6 mm.

9. The valve assembly defined in claim 1, further comprising
    a decor sleeve fitted to the housing and traversed by the stem.

10. A method of assembling a valve assembly comprising when assembled:
    a housing forming an outlet and having an axis;
    means for securing the housing on a support surface;
    a support block in the housing having a pair of inlet ports adapted to be connected to pressurized feed lines and an output port communicating with the outlet of the housing;
    a valve cartridge sitting on the support block and including
        a casing centered on the housing axis and having a rear end formed with axially rearwardly directed bumps and a front end,
        a stack of disks in the casing including an end disk formed with ports and at least one valve disk displaceable to vary flow from the inlet ports to the outlet port, seals projecting axially forward from the ports past the casing and having end faces engaging a surface of the support block at the respective ports, and a stem projecting axially rearward from the casing and displaceable to move the valve disk;

a retaining sleeve formed with a screwthread threadedly engaging the housing, centered on the axis, surrounding the valve cartridge, having a front end bearing directly on the support block, having a shoulder bearing axially forward on the bumps of the casing and pressing the seals into the support-block ports, and having an overall length measured parallel to the axis between the respective front end and the shoulder, whereby the casing is retained by the sleeve on the support block; and a handle mounted on the stem outside the housing, the method comprising the steps of:

inserting the cartridge into the housing and fitting the seals to the respective support-block ports;

cutting down the bumps such that the cartridge has an overall length from rear faces of the bumps to the end faces of the seals equal to somewhat more than the overall length of the sleeve;

screwing the sleeve into the housing until its end face directly abuts the support block, the end faces of the seals engage the respective surfaces of the support lock, and the disks and casing are spaced from the support block.

11. The method defined in claim 10 wherein the spacing is at most 0.6 mm.

12. The method defined in claim 10 wherein the sleeve is made integrally of plastic with the bumps and the bumps are cut down by heat.

* * * * *